(12) United States Patent
Saitoh et al.

(10) Patent No.: US 8,619,204 B2
(45) Date of Patent: Dec. 31, 2013

(54) LIQUID CRYSTAL SHUTTER AND LIQUID CRYSTAL SHUTTER EYEGLASS

(75) Inventors: Goroh Saitoh, Minato-ku (JP); Masao Imai, Minato-ku (JP)

(73) Assignee: NEC Corporation, Tokyo (JP)

( * ) Notice: Subject to any disclaimer, the term of this patent is extended or adjusted under 35 U.S.C. 154(b) by 191 days.

(21) Appl. No.: 13/378,868

(22) PCT Filed: May 11, 2010

(86) PCT No.: PCT/JP2010/057944
§ 371 (c)(1),
(2), (4) Date: Dec. 16, 2011

(87) PCT Pub. No.: WO2010/146948
PCT Pub. Date: Dec. 23, 2010

(65) Prior Publication Data
US 2012/0092571 A1    Apr. 19, 2012

(30) Foreign Application Priority Data
Jun. 19, 2009   (JP) ................................. 2009-146495

(51) Int. Cl.
*G02F 1/1335*    (2006.01)

(52) U.S. Cl.
USPC ............................... 349/13; 349/16; 349/123

(58) Field of Classification Search
USPC ............................................ 349/13, 16, 123
See application file for complete search history.

(56) References Cited

FOREIGN PATENT DOCUMENTS

| | | |
|---|---|---|
| JP | 50-141344 A | 11/1975 |
| JP | 1-191123 A | 8/1989 |
| JP | 3-188419 A | 8/1991 |
| JP | 5-24766 U | 3/1993 |
| JP | 5-297402 A | 11/1993 |
| JP | 6-84429 U | 12/1994 |
| JP | 2000-338492 A | 12/2000 |
| JP | 2004-258372 A | 9/2004 |
| JP | 2005-195196 A | 7/2005 |
| JP | 2005-202304 A | 7/2005 |
| JP | 2006-186768 A | 7/2006 |
| WO | 2010/098341 A | 9/2010 |

OTHER PUBLICATIONS

Lewis, M.R. et al., "Hybrid Aligned cholesteric; A novel liquid-crystal alignment", Applied Physics Letters, vol. 51, No. 15, pp. 1197-1199, Oct. 12, 1987.

(Continued)

*Primary Examiner* — Phu Vu
(74) *Attorney, Agent, or Firm* — Sughrue Mion, PLLC

(57) ABSTRACT

A liquid crystal shutter that realizes a high speed response and that solves a problem in which light leakage cannot be alleviated is provided. An alignment film coated on substrate 5a adjacent to another liquid crystal device of substrates (5a) and (5b) of each of liquid crystal devices (2a, 2b) is horizontal alignment film (7a) and alignment film coated on the other substrate (5b) is vertical alignment film (7b). A alignment treatment is performed on the horizontal alignment film coated on substrate (5a) of liquid crystal device (2b) having a polarizer (3) in a direction parallel to a light transmission axis of analyzer (4) and an alignment treatment is performed on the horizontal alignment film coated on substrate (5a) of liquid crystal device (2a) having analyzer (4) in a direction parallel to the light transmission axis of polarizer (4). Liquid crystal materials (6) of liquid crystal devices (2a, 2b) have a positive dielectric anisotropy and have twisting directions that is the reverse of each other.

8 Claims, 9 Drawing Sheets

(56) References Cited

OTHER PUBLICATIONS

Kubono, Atusushi, et al., "Electro-optical response of hybrid twisted nematic liquid crystal displays", Journal of Applied Physics, vol. 89, No. 7, pp. 3554-3559, Apr. 1, 2001.

Kubono, Atsushi, et al., "Effect of cell parameters on the properties of hybrid twisted nematic displays", Journal of Applied Physics, vol. 90, No. 12, pp. 5859-5865, Dec. 15, 2001.

Office Action dated Dec. 18, 2012, issued by the Japanese Patent Office in counterpart Japanese Application No. 2011-519683.

LIQUID CRYSTAL SHUTTER AND LIQUID CRYSTAL SHUTTER EYEGLASS

CROSS REFERENCE TO RELATED APPLICATIONS

This application is a National Stage of International Application No. PCT/JP2010/057944 filed on May 11, 2010, which claims priority from Japanese Patent Application No. 2009-146495 filed Jun. 19, 2009, the contents of all of which are incorporated herein by reference in their entirety.

TECHNICAL FIELD

The present invention relates to a liquid crystal shutter and a liquid crystal shutter eyeglass, in particular, to a liquid crystal shutter eyeglass that serves to observe a field sequential display that displays a plurality of images on a time-division basis.

BACKGROUND ART

Field sequential display systems that have a field sequential display that displays a plurality of images on a time-division basis and a liquid crystal shutter eyeglass have been proposed and developed.

As field sequential display systems, for example three-dimensional display systems that allow the viewer to perceive three-dimensional images, are known.

FIG. 1 is a schematic diagram exemplifying a three-dimensional display system. In FIG. 1, the three-dimensional display system includes liquid crystal display device 100 that is a field sequential display and liquid crystal shutter eyeglass 101. Liquid crystal shutter eyeglass 101 has a liquid crystal shutter 101a for right-eye and a type liquid crystal shutter 101b for left-eye.

Liquid crystal display device 100 alternately displays images for right eye and images for left eye. Right-eye type liquid crystal shutter 101a and left-eye type liquid crystal shutter 101b individually change between a light transmitting state in which light is caused to transmit and a light shading state in which light is caused to be shaded in synchronization with images for right eye and images for left eye that are displayed. Thus, images for right eye enter the right eye of viewer 102, whereas images for left eye enter the left eye of viewer 102. If images for right eye and images for left eye are images that cause a parallax on the right and left eyes, these images can cause the viewer to perceive three-dimensional images.

As field sequential display systems, multi-view display systems that cause a plurality of viewers to perceive different images are known. A multi-view display system is presented in Patent Literature 1. The structure of the multi-view display system is the same as that of the three-dimensional display system shown in FIG. 1.

In the multi-view display system, liquid crystal display device 100 successively displays images for a plurality of viewers. Liquid crystal shutter eyeglass 101, that each of the plurality of viewers wears, changes between the light transmitting state and the light shading state in synchronization with images displayed for the viewers. As a result, the multi-view display system can cause a plurality of viewers to perceive different images.

FIG. 2 is a descriptive diagram exemplifying the operation of a multi-view display system. In FIG. 2, three viewers 102a to 102c respectively wear liquid crystal shutter eyeglass 101.

Liquid crystal display device 100 successively displays image A1, image B1, image C1, and image A2. Liquid crystal shutter eyeglass 101 of viewer 102a changes to the light transmitting state when images A1 and A2 are displayed; liquid crystal shutter eyeglass 101 changes to the light shading state when other images are displayed. Thus, viewer 102a successively perceives images A1 and A2.

Likewise, liquid crystal shutter eyeglass 101 of viewer 102b changes to the light transmitting state when image B1 is displayed; liquid crystal shutter eyeglass 101 changes to the light shading state when other images are displayed. Likewise, liquid crystal shutter eyeglass 101 of viewer 102c changes to the light transmitting state when image C1 is displayed; liquid crystal shutter eyeglass 101 changes to the light shading state when other images are displayed. Thus, viewer 102b perceives image B1, whereas viewer 102c perceives image C1.

As a result, viewers 102a to 102c perceive different images.

As field sequential display systems, a secure display system that causes only viewers who wear a liquid crystal shutter eyeglass to perceive images is known. With a display for a portable information terminal such as a note-type personal computer as a field sequential display, a secure display system can function as a highly secured portable information terminal.

FIG. 3 is a schematic diagram exemplifying a secured display system.

In FIG. 3, field sequential display 104 of portable information terminal 103 alternately displays images and their inverted images, for example, image A, inverted image A' of image A, image B, inverted image B' of image B.

In this case, since a viewer who does not wear liquid crystal shutter eyeglass 101 perceives an achromatic image of which an image and its inverted image have been integrated, he or she cannot perceive images A and B.

In contrast, when liquid crystal shutter eyeglass 101 changes to the light transmitting state in synchronization with images A and B displayed and changes to the light shading state in synchronization with inverted images A' and B' displayed, viewer 102, who wears liquid crystal shutter eyeglass 101, can perceive images A and B.

Thus, the secure display system can cause only viewers who wear liquid crystal shutter eyeglass 1 to perceive images A and B.

The liquid crystal shutter eyeglass of the foregoing field sequential display system needs to have a high contrast in which the difference between the amount of light transmitted in the light transmitting state and that in the light shading state is large and need to have a high speed response in which the state is quickly changed between the light transmitting state and the light shading state. Unless these characteristics are satisfied, phenomena in which an image to be shaded is perceived by a viewer (crosstalk) and in which an image displayed darkens arise and thereby excellent display images cannot be provided to the viewers.

In addition, since the alignment state of liquid crystal in which a voltage is applied to liquid crystal of the liquid crystal shutter (ON state) differs from that in which no voltage is applied thereto (OFF state), the transmissivity of the liquid crystal shutter changes. Thus, by changing the state of liquid crystal between the ON state and the OFF state, the liquid crystal shutter changes between the light transmitting state and the light shading state.

However, the period of time during which the ON state of the liquid crystal changes to the OFF state in the case in which a voltage applied to the liquid crystal that lies in the ON state is stopped (OFF state response time) is longer than that for which the OFF state of the liquid crystal changes to the ON state in the case that a voltage is applied to the liquid crystal that lies in the OFF state (ON state response time). Thus, the period of time during which the liquid crystal shutter changes from the light transmitting state to the light shading state differs from that during which the liquid crystal shutter is changed from the light shading state to the light transmitting state. If there is such a time difference, a problem arises a crosstalk or the like occurs and thus excellent display images cannot be provided to the viewers.

As a technique for solving can solve the foregoing problem, a liquid crystal display device presented in Patent Literature 2 and a light control device presented as Patent Literature 3 are known.

In the liquid crystal display device presented in Patent Literature 2, two liquid crystal cells in which nematic liquid crystal is horizontally aligned are stacked such that alignment treatment directions of the liquid crystal cells are orthogonal to each other and polarizing layers are formed on both the principal planes of the stacked liquid crystal cells.

If no voltage is applied to both the liquid crystal cells of the liquid crystal display device, it changes to the light shading state; if voltage is applied to one of the liquid crystal cells, the liquid crystal display device changes to the light transmitting state; and if a voltage is applied to both the liquid crystal cells, the liquid crystal display device changes to the light shading state.

Thus, assuming that the light shading state in the case in which no voltage is applied to both the liquid crystal cells is the initial state, by applying a voltage to one of the liquid crystal cells, the liquid crystal display device changes the light shading state to the light transmitting state, then by applying a voltage to the other liquid crystal cell, the liquid crystal display device changes the light transmitting state to the light shading state. By stopping voltage from being applied to both the liquid crystal cells, the liquid crystal display device is restored to the initial state.

Thus, since both the period of time during which the light shading state is changed to the light transmitting state and the period of time during which the light transmitting state is changed to the light shading state become nearly the same as the ON state response time. As a result, the period of time for which the light transmitting state is changed to the light shading state can be the same as the period of time during which the light shading state is changed to the light transmitting state.

On the other hand, in the light control device presented in Patent Literature 3, two TN type liquid crystal cells are stacked such that the alignment treatment directions of the liquid crystal cells are orthogonal to each other in the state in which no voltage is applied to the cells and polarizing layers are formed on both the principal planes of the stacked liquid crystal cells. If the light control device is driven in the same manner as the liquid crystal display device presented in Patent Literature 2, the period of time during which the light transmitting state is changed to the light shading state can be the same as the period of time during which the light shading state is changed to the light transmitting state.

In addition, as a technique that can realize a high contrast, a liquid crystal display device presented as Patent Literature 4 is known.

In the liquid crystal display device presented in Patent Literature 4, two TN type liquid crystal cells are stacked in such a manner that the alignment axes on the view side of the liquid crystal cells lie within 10° and that polarizing layers are formed above, below, and between the stacked TN type liquid crystal cells. Thus, since two TN type liquid crystal cells are stacked, a higher contrast can be accomplished than in the case of the device composed of one TN type liquid crystal cell.

In addition, as a technique that can realize a high speed response, a liquid crystal device presented in Patent Literature 5 is known.

In the liquid crystal device presented in Patent Literature 5, a liquid crystal layer composed of nematic liquid crystal molecules is sandwiched between two opposite substrates. The liquid crystal device has a hybrid arrangement in which the tilt angle successively varies such that nematic liquid crystal modules are vertically aligned in the vicinity of one substrate and they are horizontally aligned in the vicinity of the other substrate. In addition, the liquid crystal device has a twist arrangement in which nematic liquid crystal molecules have reverse twisting directions with respect to the two substrates.

Experimental results show that the foregoing liquid crystal device has a higher response than ordinary twisted nematic (TN) liquid crystal display devices.

RELATED ART LITERATURE

Patent Literature

Patent Literature 1: JP2006-186768A
Patent Literature 2: JP5-297402A
Patent Literature 3: JP50-141344A
Patent Literature 4: JP2004-258372A
Patent Literature 5: JP2000-338492A

SUMMARY OF THE INVENTION

Problem to be Solved by the Invention

In the liquid crystal display device presented in Patent Literature 2, liquid crystal cells in which nematic liquid crystal is horizontally aligned are stacked. Since these liquid crystal cells generally have a high driving voltage, it is difficult to use them for a liquid crystal shutter eyeglass that is often driven by a battery. In addition, since the OFF state response time is long, it takes a long time after a voltage applied to both liquid crystal cells has stopped until the initial state is restored and thus a high speed response cannot be obtained. As a result, it is difficult to apply the technique presented in Patent Literature 2 to a liquid crystal shutter eyeglass.

The light control device presented in Patent Literature 3 uses TN type liquid crystal cells instead of horizontally aligned nematic liquid crystal. Since the OFF state response time of the TN type liquid crystal cells is short and can be driven at a low voltage, a high speed response can be accomplished.

However, as described in FIG. 8 and page 13 of Patent Literature 3, when both TN type liquid crystal cells are turned off, light leakage occurs.

Although the liquid crystal display device presented in Patent Literature 4 improves contrast using the static driving scheme; the patent literature does not mention light leakage of the display device that is in the light shading state and OFF state. The driving scheme of the liquid crystal display device presented in Patent Literature 4 largely differs from the schemes presented in Patent Literatures 2 and 3.

Although the liquid crystal display device presented in Patent Literature 5 can realize a high speed response, the literature does not mention light leakage in the light shading state and OFF state. Although this liquid crystal display device has a high ON state response time, since liquid crystal cells use the hybrid alignment scheme, the angular dependency of the direction and tilting of liquid crystal molecules is greater than that of the TN type liquid crystal display device and thus the viewing angle of this device is narrower than that of the TN type liquid crystal display device.

Thus, there was a problem in which the techniques presented in Patent Literatures 2 to 4 cannot realize a high speed response and alleviate light leakage.

The light leakage presented in Patent Literature 3 is leakage of light that enters the front of a liquid crystal shutter. However, in the liquid crystal shutter, the amount of light leakage depends on the angel of incident light. Thus, if the liquid crystal shutter is used for a liquid crystal shutter eyeglass, the liquid crystal shutter has a viewing angle characteristic in which the amount of leakage of light that enters the eyes of the viewer depends on the orientation of the line of sight of the viewer. Since the line of sight of the viewer tends to more easily move in the left and right direction than the up and down direction, it is preferable to reduce light leakage that occurs in the left and right direction of the liquid crystal shutter that is in the light shading state. However, Patent Literatures 2 and 3 do not mention the viewing angle characteristic of the liquid crystal shutter.

An object of the present invention is to solve the foregoing problems, realize a high speed response, and provide a liquid crystal shutter and a liquid crystal shutter eyeglass that solve the problem in which light leakage cannot be alleviated.

Means that Solve the Problem

A liquid crystal shutter according to the present invention has a stack structure in which a pair of liquid crystal devices are stacked, the pair of liquid crystal devices having a pair of substrates on which alignment films are coated and a liquid crystal material injected into the pair of substrates; a polarizer formed on one of two principal planes of said stack structure; and an analyzer formed on the other principal plane of said stack structure, wherein a light transmission axis of said polarizer is intersected with that of said analyzer, wherein an alignment film coated on a substrate adjacent to another liquid crystal device of said pair of substrate of each of the liquid crystal devices is a horizontal alignment film and an alignment film coated on the other substrate is a vertical alignment film, wherein alignment treatment is performed on the horizontal alignment film of the liquid crystal device having said polarizer of said stack structure in a direction parallel with the light transmission axis of said analyzer and alignment treatment is performed on the horizontal alignment film of the liquid crystal device having the analyzer of said stack structure in a direction parallel with the light transmission axis of said polarizer, and wherein liquid crystal materials of the liquid crystal devices have a positive dielectric anisotropy and have twisting directions that is the reveres of each other.

In addition, a liquid crystal shutter eyeglass according to the present invention has said liquid crystal shutter.

Effect of the Invention

According to the present invention, a high speed response can be realized and light leakage can be alleviated.

CARRY OUT THE INVENTION

Figure 1:
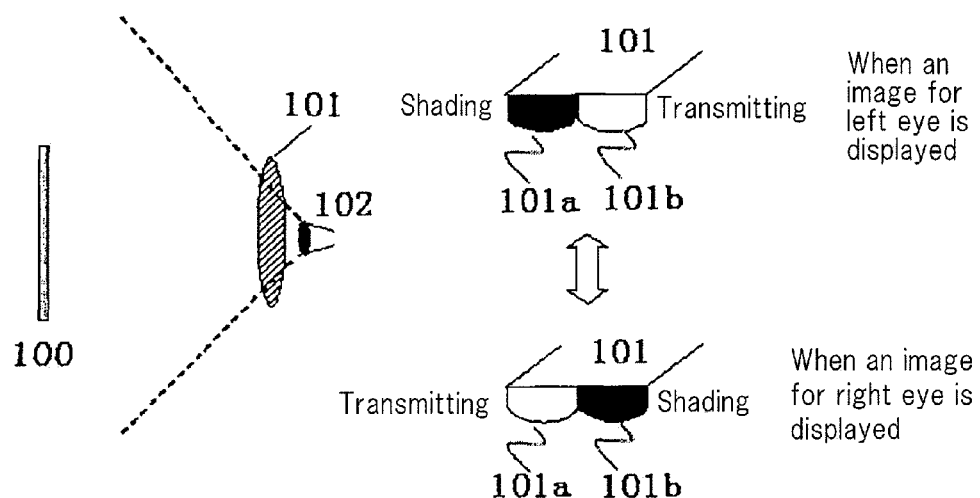
FIG. 1 is a schematic diagram exemplifying a three-dimensional display system.
Figure 2:
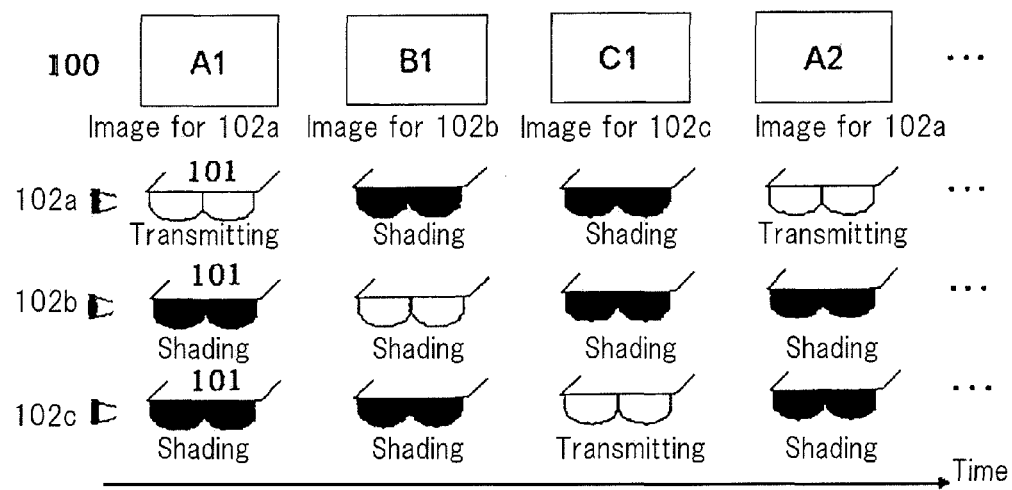
FIG. 2 is a descriptive diagram exemplifying an operation of a multi-view display system.
Figure 3:
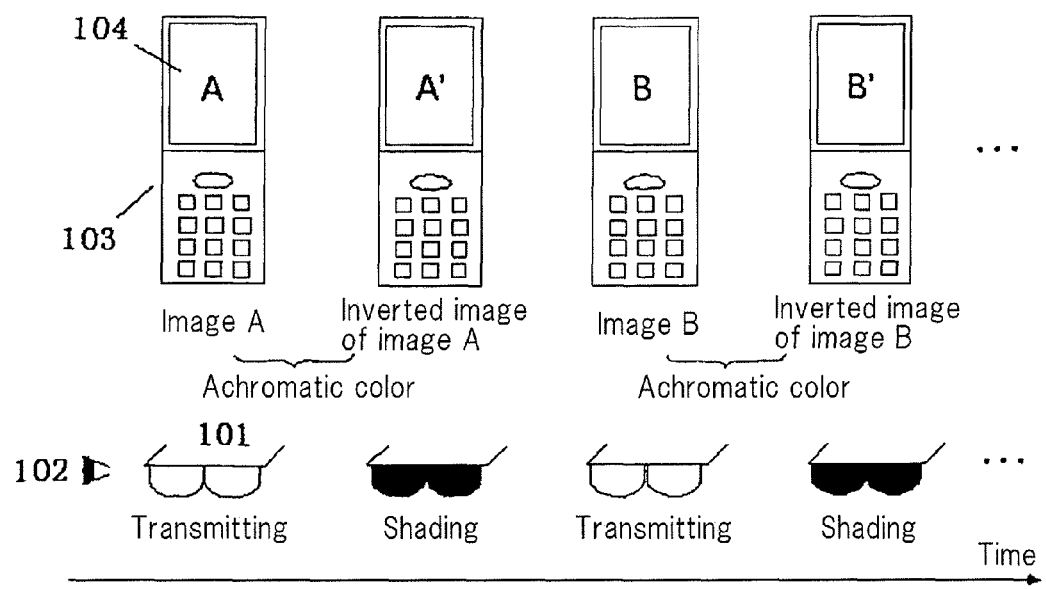
FIG. 3 is a schematic diagram exemplifying a secure display system.

Next, with reference to the accompanying drawings, exemplary embodiments of the present invention will be described. In the following description, sections having similar functions are denoted by similar reference numerals and their description may be omitted.

Figure 4:
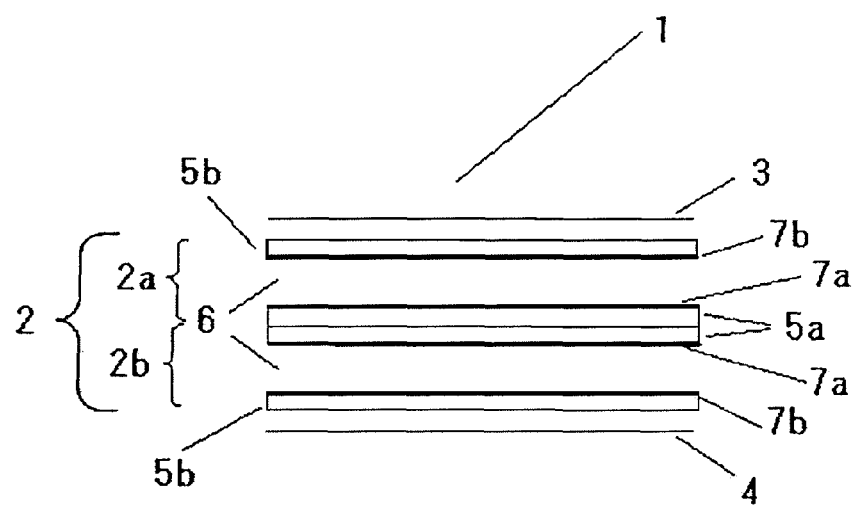
FIG. 4 is a sectional view schematically showing a liquid crystal shutter according to an exemplary embodiment of the present invention.

FIG. 4 is a sectional view schematically showing a liquid crystal shutter according to an exemplary embodiment of the present invention. In FIG. 4, liquid crystal shutter 1 has stack structure 2 in which a pair of liquid crystal devices 2*a* and 2*b* are stacked, polarizer 3 formed on one of both principal planes of stack structure 2, and analyzer 4 formed on the other principal planes of stack structure 2.

Alternatively, liquid crystal shutter 1 may have a plurality of stack structures 2 and they may be stacked. In this case, polarizer 3 is formed on an upper plane of stack structure 2 of uppermost layer and analyzer 4 is formed on a lower plane of stack structure 2 of lowermost layer.

Each of liquid crystal devices 2a and 2b formed in stack structure 2 has a pair of substrates 5a and 5b that are formed opposite to each other and liquid crystal material 6 is injected between substrates 5a and 5b. It is assumed that substrates 5a of liquid crystal devices 2a and 2b are formed adjacent to each other.

Alignment films are coated on opposite planes of substrates 5a and 5b of each of liquid crystal devices 2a and 2b. More specifically, an alignment film formed on one of substrates 5a and 5b is horizontal alignment film 7a, whereas an alignment film formed on the other of substrates 5a and 5b is vertical alignment film 7b. Further specifically, an alignment film coated on substrate 5a that is formed adjacent to the other liquid crystal device of each of liquid crystal devices 2a and 2b is horizontal alignment film 7a, whereas an alignment film coated on substrate 5b other than substrate 5a is vertical alignment film 7b.

It is assumed that substrates 5a and 5b are provided with electrodes (not shown) by which a voltage is applied to liquid crystal device 2a or 2b. Both principal planes of stack structure 2 are planes that are parallel with substrates 5a and 5b of liquid crystal devices 2a and 2b formed in stack structure 2.

Liquid crystal material 6 of each of liquid crystal devices 2a and 2b has a positive dielectric anisotropy.

Polarizer 3 and analyzer 4 are polarizing devices that cause light having a polarization plane that is parallel with a predetermined light transmitting axis to transmit therethrough and the light transmitting axis of polarizer 3 is intersected with that of analyzer 4 each other. It is preferable that the angle at which they are intersected with each other be 90°. In other words, it is preferable that polarizer 3 and analyzer 4 have the crossed Nichol state in which the light transmitting axis of polarizer 3 is intersects with that of analyzer 4.

Next, liquid crystal material 6 will be described in more detail.

Figure 5A:
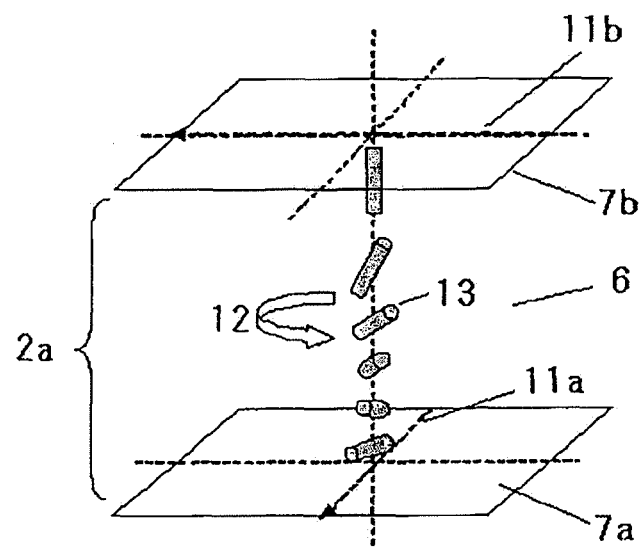
FIG. 5A is a perspective sectional view exemplifying a structure of a liquid crystal material.
Figure 5B:
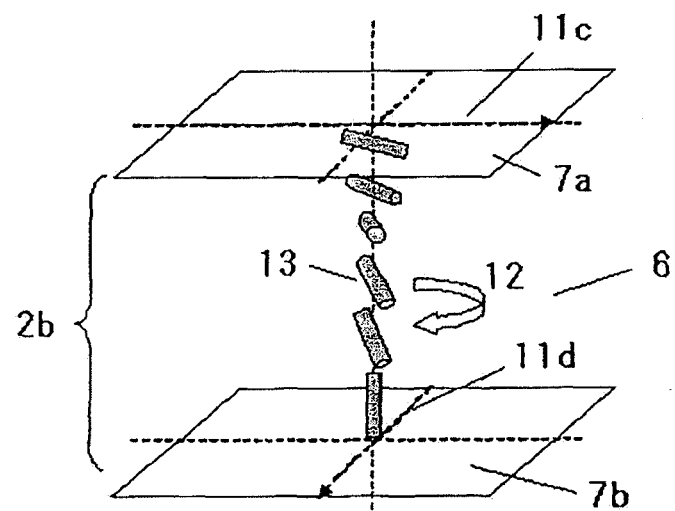
FIG. 5B is a perspective sectional view exemplifying another structure of the liquid crystal material.
Figure 5C:
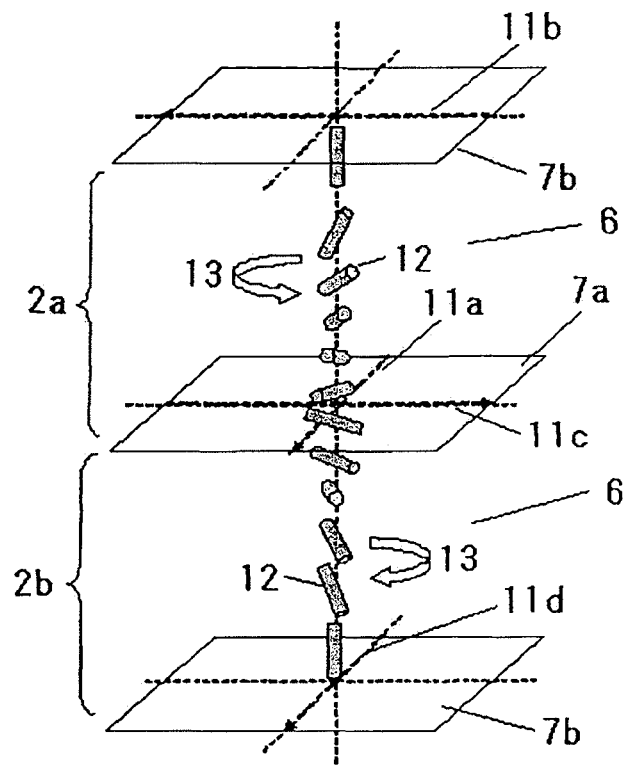
FIG. 5C is a perspective sectional view exemplifying another structure of the liquid crystal material.

FIG. 5A is a perspective sectional view schematically showing liquid crystal material 6 of liquid crystal device 2a, FIG. 5B is a perspective sectional view schematically showing liquid crystal material 6 of liquid crystal device 2b, and FIG. 5C is a perspective sectional view schematically showing liquid crystal material 6 of liquid crystal shutter 1.

As shown in FIG. 5A to FIG. 5C, liquid crystal materials 6 of liquid crystal devices 2a and 2b have twisting directions that are the reverse each other.

Liquid crystal shutter 1 having liquid crystal devices 2a and 2b shown in FIG. 5A to FIG. 5C can be formed, for example, as follows.

First, two sets of two substrates each having a transparent electrode are prepared and then these substrates are designated as substrates 5a and 5b of liquid crystal device 2a and substrates 5a and 5b of liquid crystal device 2b. Thereafter, horizontal alignment film 7a is coated on the front surface of each substrate 5a, whereas vertical alignment film 7b is coated on the front surface of each substrate 5b.

Thereafter, alignment treatment is performed on horizontal alignment films 7a and alignment films 7b. In this example, alignment treatment is performed in such a manner that the alignment treatment directions of horizontal alignment film 7a and vertical alignment film 7b contained in the same liquid crystal device intersect with each other at a predetermined angle.

A alignment treatment is performed on the horizontal alignment film coated on substrate 5a of liquid crystal device 2a having polarizer 3 in a direction that is parallel to the light transmitting axis of analyzer 4. Likewise, alignment treatment is performed on the horizontal alignment film coated on substrate 5a of liquid crystal device 2b having analyzer 4 in a direction that is parallel to the light transmitting axis of analyzer 4.

Thereafter, liquid crystal material 6 having a positive dielectric anisotropy is injected between substrates 5a and 5b of each of liquid crystal devices 2a and 2b.

At this point, the twisting direction of liquid crystal material 6 depends on the twisting direction defined corresponding to the alignment treatment directions of horizontal alignment film 7a and vertical alignment film 7b and a natural twisting direction of liquid crystal material 6.

According to this exemplary embodiment, liquid crystal material 6 is injected such that the twisting direction defined corresponding to the alignment treatment directions of horizontal alignment film 7a and vertical alignment film 7b matches the natural twisting direction of liquid crystal material 6. As a result, the twisting direction of liquid crystal material 6, the twisting direction defined corresponding to the alignment treatment directions, and the natural twisting direction of liquid crystal material 6 match each other.

By stacking liquid crystal devices 2a and 2b formed in the foregoing manner, liquid crystal shutter 1 can be formed. In this example, liquid crystal devices 2a and 2b are stacked such that substrates 5a of liquid crystal devices 2a and 2b are formed adjacent to each other. In addition, liquid crystal devices 2a and 2b are stacked such that liquid crystal materials 6 of liquid crystal devices 2a and 2b have twisting directions that are the reverse each other.

Alternatively, alignment treatment may not be performed on vertical alignment film 7b. In this case, the twisting direction of liquid crystal material 6 injected between substrates 5a and 5b is defined only corresponding to the natural twisting direction of liquid crystal material 6.

FIG. 5A to FIG. 5C show alignment treatment directions 11a to 11d of substrates 5a and 5b of liquid crystal devices 2a and 2b. Specifically, alignment treatment direction 11a is an alignment treatment direction of substrate 5a of liquid crystal device 2a, alignment treatment direction 11b is an alignment treatment direction of substrate 5b of liquid crystal device 2a, alignment treatment direction 11c is an alignment treatment direction of substrate 5a of liquid crystal device 2b, and alignment treatment direction 11d is an alignment treatment direction of substrate 5b of liquid crystal device 2b.

Alignment treatment directions 11a and 11b intersect with each other and also alignment treatment directions 11c and 11d intersect with each other. On the other hand, alignment treatment directions 11a and 11d are the same, whereas alignment treatment directions 11b and 11c are reverse.

In this example, it is preferable that alignment treatment directions 11a and 11b be orthogonal to each other. In this case, it is preferable that alignment treatment directions 11c and 11d also be orthogonal to each other.

In addition, it is preferable that the product of the thicknesses of liquid crystal material 6 of liquid crystal device 2a and the refractive index anisotropy $\Delta n$ of liquid crystal material 6, (d·Δ), be equal to or nearly equal to the product of the thickness of liquid crystal material 6 of liquid crystal device 2b and the refractive index anisotropy $\Delta n$ of liquid crystal material 6.

In addition, it is preferred that chiral pitches of liquid crystal materials 6 of liquid crystal devices 2a and 2b be equal to or nearly equal to each other.

Next, a liquid crystal shutter eyeglass having a liquid crystal shutter will be described.

Figure 6A:
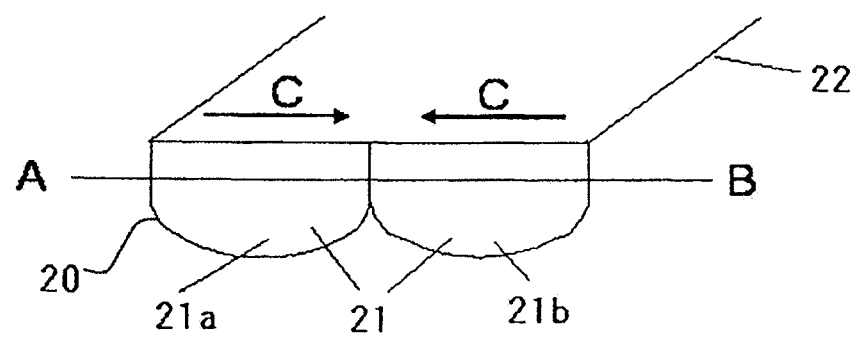
FIG. 6A is an external view schematically showing a liquid crystal shutter eyeglass.

FIG. 6A is an external view schematically showing a liquid crystal shutter eyeglass having a liquid crystal shutter. In FIG. 6A, liquid crystal shutter eyeglass 20 has liquid crystal shutter 21 and eyeglass frame 22.

Liquid crystal shutter 21 has right-eye type liquid crystal shutter 21a and left-eye type liquid crystal shutter 21b.

Liquid crystal shutters 21a and 21b are attached to lens portions of eyeglass frame 22. Liquid crystal shutters 21a and 21b have the same structure as liquid crystal shutter 1 including stack structure 2.

Figure 6B:
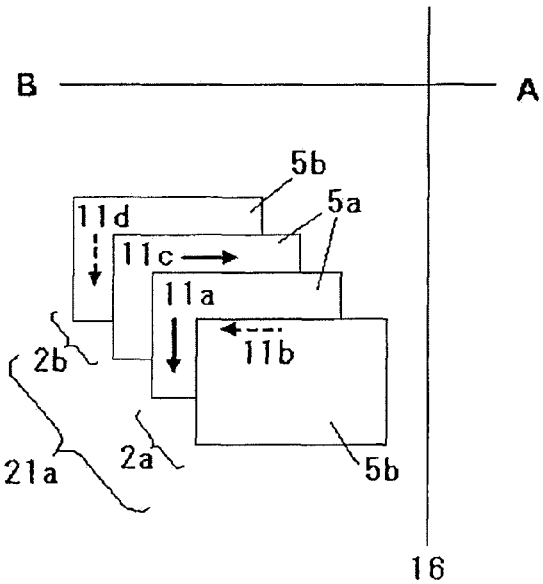
FIG. 6B is a schematic diagram exemplifying a structure of a liquid crystal shutter used for a liquid crystal shutter eyeglass.

FIG. 6B is a schematic diagram showing the structure of liquid crystal shutters 21a and 21b used for liquid crystal shutter eyeglass 20. In FIG. 6B, liquid crystal device 2a is formed on the rear side (viewer side) of liquid crystal shutter eyeglass 20, whereas liquid crystal device 2b is formed on the front side (opposite side of the viewer side) of liquid crystal shutter eyeglass 20.

An alignment treatment is performed on horizontal alignment film 7a of liquid crystal device 2b in the width direction (left and right direction, namely A-B direction in FIG. 6A) of liquid crystal shutter eyeglass 20. In other words, alignment treatment direction 11c matches the width direction of liquid crystal shutter eyeglass 20. As a result, alignment treatment direction 11c is orthogonal to center line 16 of the face of the viewer.

Figure 6C:
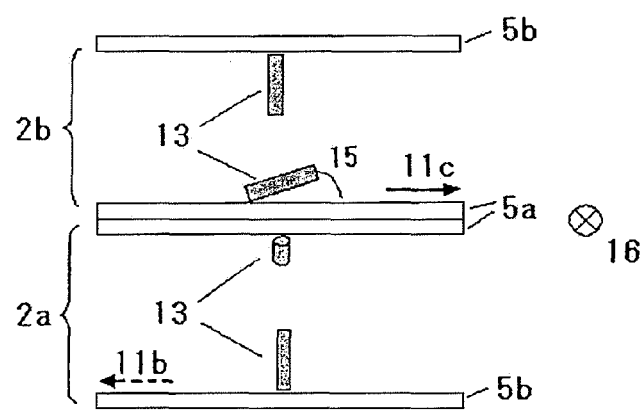
FIG. 6C is a schematic diagram showing the alignment treatment direction and the pre-tilt angular direction of a liquid crystal shutter.

FIG. 6C is a schematic diagram showing the alignment treatment direction and the pre-tilt angle of liquid crystal shutter 1 of liquid crystal shutter eyeglass 20.

As shown in FIG. 6C, the longer axes of liquid crystal molecules 13 on substrate 5a having horizontal alignment film 7a (at the interface of substrate 5a) are located apart from substrate 5a in reverse proportion to the distance from the inside of liquid crystal shutter glasses 20 (the direction of arrow C in FIG. 6A) of liquid crystal shutter eyeglass 20. Thus, pre-tilt angle 15 of substrate 5a orients the center line of the face of the viewer and thereby the lateral viewing angle characteristic of the viewer can be improved.

Next, the operation of liquid crystal shutter 1 will be described.

Figure 7:
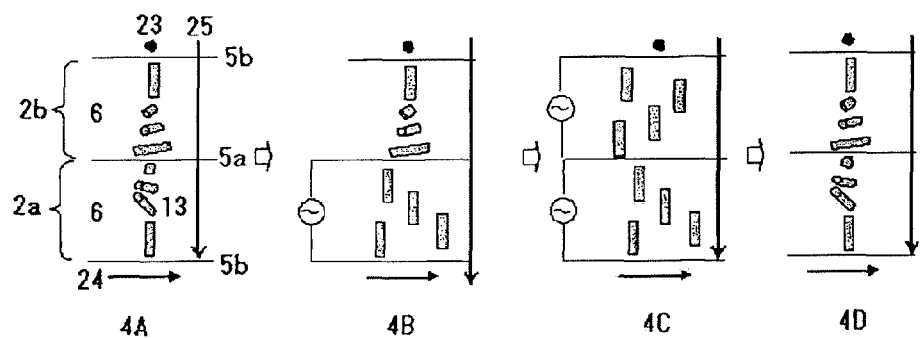
FIG. 7 is a descriptive diagram describing an operation of a liquid crystal shutter using a 90° H-TN type liquid crystal device.
Figure 8:
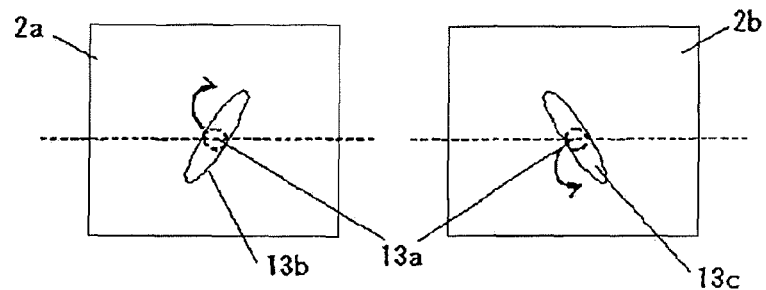
FIG. 8 is a schematic diagram showing the motion of liquid crystal molecules that have changed due to a voltage applied state to a non-voltage applied state.

FIG. 7 and FIG. 8 are descriptive diagrams describing the operation of liquid crystal shutter 1. Polarizer 3 is formed on the upper plane of liquid crystal device 2b and the direction of the light transmitting axis of polarizer 3 is direction 23 perpendicular to the drawing. On the other hand, analyzer 4 is formed on the lower plane of liquid crystal device 2a and the direction of the light transmitting axis of analyzer 4 is direction 24 that is in parallel with the drawing. In other words, polarizer 3 and analyzer 4 are formed in the crossed Nichol state.

FIG. 7 shows states 4A to 4D that are alignment states of liquid crystal molecules 13 in liquid crystal shutter 1.

When liquid crystal shutter 1 is in the both OFF state in which a voltage is not applied to both liquid crystal devices 2a and 2b, liquid crystal molecules 13 are in state 4A. In state 4A, the longer axes of liquid crystal molecules 13 of liquid crystal devices 2a and 2b orient a direction that is parallel to substrate 5a at the interface thereof. In addition, the longer axes of liquid crystal molecules 13 are gradually twisted and tilted in a direction perpendicular to substrates 5a and 5b and orient the direction in reverse proportion of the distance to substrate 5b and they orient a direction perpendicular to substrates 5a and 5b at the interface of substrate 5b in reverse proportion to the distance from substrate 5b.

In the following, it is assumed that the alignment treatment directions of the alignment films of liquid crystal devices 2a and 2b are orthogonal to each other. In other words, it is assumed that liquid crystal materials 6 of liquid crystal devices 2a and 2b have a twisting angle of 90° to each other. Such a liquid crystal device may be referred to as a 90° H-TN type liquid crystal device.

In state 4A, incident light 25 that enters liquid crystal shutter 1 transmits through polarizer 3, becomes polarized light, and then enters liquid crystal devices 2a and 2b. When incident light 25 transmits through liquid crystal devices 2a and 2b, the polarization plane of incident light 25 rotates around the twisting direction of liquid crystal material 6. Since liquid crystal materials 6 injected into liquid crystal devices 2a and 2b have twisting directions that are the reverse of each other, the polarization plane of incident light 25 is rotated by 90° by liquid crystal device 2b and then restored by liquid crystal device 2a.

Since polarizer 3 and analyzer 4 have been formed in the crossed Nichol state, incident light 25 is not transmitted through analyzer 4, but is absorbed by analyzer 4. As a result, liquid crystal shutter 1 changes to the light shading state in which light is caused to be shaded.

When liquid crystal shutter 1 changes from the both OFF state to the single OFF state in which a voltage equal to or higher than a saturated voltage is applied to one of liquid crystal devices 2a and 2b, the arrangement of liquid crystal molecules 13 changes to state 4B. The saturated voltage is a minimum voltage at which the orientations of liquid crystal molecules 13 of liquid crystal material 6 change and is decided depending on liquid crystal material 6.

In state 4B, the longer axes of liquid crystal molecules 13 of liquid crystal device 2a orient perpendicular to substrate 5a and thereby twisting of liquid crystal material 6 in liquid crystal device 2a disappears. The twisting of liquid crystal molecules of liquid crystal material 6 of liquid crystal device 2b is the same as that in state 4A.

In this case, the polarization plane of incident light 25 does not rotate in liquid crystal device 2a. Thus, incident light 25 whose polarization plane has rotated by 90° enters analyzer 4 and is transmitted through analyzer 4. Thus, liquid crystal shutter 1 becomes the light transmitting state in which light is caused to be transmitted.

When liquid crystal shutter 1 changes from the single OFF state to the both OFF state in which a voltage equal to or higher than the saturated voltage is applied to both liquid crystal devices 2a and 2b, the arrangement of liquid crystal molecules 13 changes to state 4C.

In state 4C, the longer axes of liquid crystal molecules 13 of liquid crystal devices 2a and 2b are aligned perpendicular to substrate 5a and thereby twisting of liquid crystal material 6 of liquid crystal device 2b disappears.

In this case, the polarization plane of incident light 25 does not rotate in liquid crystal devices 2a and 2b and thereby incident light 25 cannot be transmitted through analyzer 4 and liquid crystal shutter 1 changes to the light shading state.

Thus, by applying a voltage to liquid crystal shutter 1 in the foregoing manner, liquid crystal shutter 1 can be changed from the light shading state to the light transmitting state or vice versa. As a result, liquid crystal shutter 1 can be changed between the light transmitting state and the light shading state at high speed. Although a voltage may be applied successively to liquid crystal devices 2b and 2a, it is preferable that a voltage be applied successively to liquid crystal devices 2a and 2b as described above.

When liquid crystal shutter 1 changes from the both ON state to the both OFF state in which a voltage applied to liquid crystal devices 2a and 2b is stopped, the arrangement of liquid crystal molecules 13 changes to state 4D.

In state 4D, liquid crystal materials 6 of liquid crystal devices 2a and 2b have twisting direction that are reverse of each other. At this point, liquid crystal shutter 1 lies in the light shading state.

FIG. 8 is a schematic diagram showing the motion of liquid crystal molecules 13 when their arrangement changes from state 4C to state 4D.

As shown in FIG. 8, liquid crystal molecule 13a of liquid crystal molecules 13 of liquid crystal devices 2a and 2b that is in state 4C is aligned perpendicular to substrate 5a. In state 4D, liquid crystal molecule 13b of liquid crystal device 2a and liquid crystal molecule 13c of liquid crystal device 2b have twisting directions that are reverse of each other.

Thus, when the arrangement of liquid crystal molecules 13 changes from state 4C to state 4D, liquid crystal molecule 13a of each of liquid crystal devices 2a and 2b in state 4C is twisted symmetrically with respect to the normal of substrate 5a. As a result, since the arrangement of liquid crystal molecules 13 can be changed from state 4C to state 4 while liquid crystal shutter 1 lies in the light shading state, light leakage can be alleviated.

Next, the structure of liquid crystal shutter eyeglass 20 that drives liquid crystal shutter 21 will be described in detail.

Figure 9:
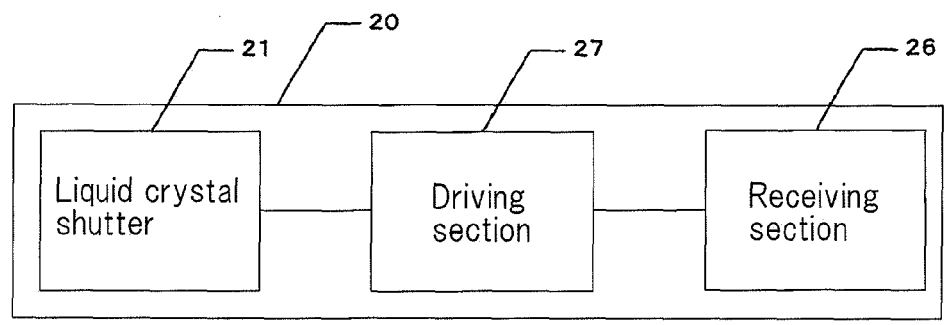
FIG. 9 is a block diagram showing a structure in which a liquid crystal shutter eyeglass drives a liquid crystal shutter.

FIG. 9 is a block diagram showing the structure of liquid crystal shutter eyeglass 20 that drives liquid crystal shutter 21. In FIG. 9, liquid crystal shutter eyeglass 20 has liquid crystal shutter 21, receiving section 26, and driving section 27.

Receiving section 26 receives a synchronization signal that represents the timing at which liquid crystal shutter 21 is changed between the light transmitting state and the light shading state. Receiving section 26 may be provided, for example, on eyeglass frame 22 and receives a synchronization signal from a display device that displays an image based on a wireless communication scheme or a synchronization signal from a predetermined control device through a cable based on a wired communication scheme.

Driving section 27 applies a voltage to liquid crystal shutter 21 corresponding to the synchronization signal received by receiving section 26 and changes the state of liquid crystal shutter 21 between the light transmitting state and the light shading state.

Specifically, when liquid crystal shutter 21 is in the both OFF state, if receiving section 26 receives the synchronization signal, driving section 27 applies a voltage equal to or higher than the saturated voltage to liquid crystal device 2a or 2b so as to cause liquid crystal shutter 21 to change to the single OFF state, which is the light transmitting state. At this point, it is preferable that driving section 27 apply a voltage to liquid crystal device 2a. In the following, it is assumed that a voltage has been applied to liquid crystal device 2a so as to change the arrangement of liquid crystal molecules to state 4B.

When liquid crystal shutter 21 is in the single OFF state, if receiving section 26 receives the synchronization signal, driving section 27 applies a voltage equal to or higher than the saturated voltage to liquid crystal device 2b so as to causes liquid crystal shutter 21 to change to the both ON state, which is the light shading state. Thereafter, driving section 27 stops applying the voltage to liquid crystal devices 2a and 2b so as to cause liquid crystal shutter 21 to change to the both OFF state while causing liquid crystal shutter 21 to be in the light shading state.

If there is a plurality of stack structures 2, the same process can be repeated for liquid crystal devices 2a and 2b of each of stack structures 2.

The mechanism that alleviates the foregoing light leakage is realized by a mechanism that alleviates light leakage of incident light that enters from the front side of liquid crystal shutter 1 or 21.

Liquid crystal shutters 1 and 21 have a viewing angle characteristic in which light leakage from liquid crystal shutters 1 and 21 that are in the light shading state and a contrast that is the difference between the amount of light that transmits in the light transmitting state and the amount of light that transmits in the light shading state vary depending on the orientation of the line of sight of the viewer. In addition, the line of sight of the viewer tends to orient the width direction of liquid crystal shutter eyeglass 20.

Thus, it is preferable that liquid crystal shutters 1 and 21 be provided with a mechanism that alleviates light leakage from the width direction of liquid crystal shutter eyeglass 20. In particular, since the line of sight of the viewer tends to orient the inside of the face rather than the outside thereof, it is preferable that liquid crystal shutters 1 and 21 be provided with a mechanism that alleviates light leakage from the inside of liquid crystal shutter eyeglass 20. In the following, light leakage from the width direction of liquid crystal shutter eyeglass 20 is referred to as lateral light leakage.

Evaluations for lateral light leakage that occurs when liquid crystal shutter 1 lies in the light shading state (shading state) and the OFF state (changed from the both OFF state to the both ON state) reveled the following findings.

If the alignment treatment direction of horizontal alignment film 7a of liquid crystal device 2b formed on the front side of liquid crystal shutter eyeglass 20 is parallel to the width direction of liquid crystal shutter eyeglass 20 (FIG. 6A and FIG. 6B), namely if alignment treatment direction 11c is orthogonal to the center line of the face of the viewer, lateral light leakage is alleviated.

In particular, if liquid crystal molecules are tilted such that the longer axes of liquid crystal molecules on substrate 5a having horizontal alignment film 7a of liquid crystal device 2b are located apart from substrate 5a in reverse proportion to the distance from the inside of liquid crystal shutter glasses 20 (FIG. 6A and FIG. 6C), light leakage from the inside of liquid crystal shutter eyeglass 20 is alleviated.

By applying a voltage to liquid crystal device 2a on the rear side of liquid crystal shutter 1 of liquid crystal devices 2a and 2b that are in the both OFF state and thus by causing liquid crystal shutter 21 to change to the single OFF state, flickering of which the viewer becomes conscious can be alleviated.

This means that the direction of the maximum brightness region in which the transmissivity is the highest of liquid crystal shutter 21 that is in the light transmitting state matches the direction of a light leakage region in which the transmissivity is high in liquid crystal shutter 21 that is in the light shading state.

Next, effects of this exemplary embodiment will be summarized.

According to this exemplary embodiment, an alignment film coated on substrate 5a adjacent to the other liquid crystal device of substrates 5a and 5b of each of liquid crystal devices 2a and 2b is horizontal alignment film 7a, whereas an alignment film coated on substrate 5b other than substrate 5a is vertical alignment film 7b. On the other hand, alignment treatment is performed on a horizontal alignment film coated on substrate 5a of liquid crystal device 2b having polarizer 3 in a direction parallel to the light transmitting axis of analyzer 4, whereas alignment treatment is performed on a horizontal alignment film coated on substrate 5a of liquid crystal device 2a having analyzer 4 in a direction parallel to the light transmitting axis of polarizer 4. Liquid crystal materials 6 of liquid crystal devices 2a and 2b have a positive dielectric anisotropy and have twisting directions that are the reverse of each other.

In this case, in the OFF state in which liquid crystal devices 2a and 2b change from the both ON state to the both OFF state, liquid crystal molecule 13a of liquid crystal device 2a and liquid crystal molecule 13b of liquid crystal device 2b have reverse twisting directions each other. Thus, liquid crystal devices 2a and 2b can be changed to the both OFF state while causing them to lie in the light shading state, light leakage of liquid crystal shutter 1 that lies in the OFF state can be alleviated. As liquid crystal material 6, a TN type liquid crystal material having a short OFF state response time can be used.

Thus, a high speed response can be realized and light leakage can be alleviated.

According to this exemplary embodiment, horizontal alignment films 7a coated on substrates 5a that are adjacent are orthogonal to each other.

In this case, contrast that is the difference between the amount of light that is transmitted through liquid crystal shutter 1 in the light transmitting state and the amount of light shading state can be raised.

In addition, according to this exemplary embodiment, the product of the thickness of liquid crystal materials 6 injected into liquid crystal device 2a and the refractive index anisotropy of the liquid crystal material is equal to or nearly equal to the product of the thickness of liquid crystal material 6 injected into liquid crystal device 2b and the refractive index anisotropy of the liquid crystal molecules. In this case, since the polarization plane of incident light of liquid crystal device 2a and that of liquid crystal device 2b are reversely rotated for a nearly equal amount, light leakage from liquid crystal shutter 1 that is in the light shading state can be further alleviated.

In addition, according to this exemplary embodiment, the chiral pitches of liquid crystal materials 6 injected into liquid crystal devices 2a and 2b are equal to or nearly equal to each other. In this case, since the polarization planes of incident light of liquid crystal devices 2a and 2b are rotated at a nearly equal ratio, light leakage from liquid crystal shutter 1 that is in the light shading state can be further alleviated.

In addition, according to this exemplary embodiment, alignment treatment is performed on horizontal alignment film 7a of liquid crystal device 2b on the front side of liquid crystal shutter eyeglass 20 in the width direction (A-B direction) of liquid crystal shutter eyeglass 20. In this case, lateral light leakage can be alleviated.

In addition, according to this exemplary embodiment, liquid crystal molecules are tilted such that the longer axes of liquid crystal molecules of substrate 5a having horizontal alignment film 7a, for which an alignment treatment has been performed in the width direction of liquid crystal shutter eyeglass 20, are apart from substrate 5a in reverse proportion to the distance from the inside of liquid crystal shutter glasses 20. In this case, when the viewer watches a display or the like, light leakage from the center of the face to which the line of sight of the viewer tends to orient can be alleviated.

In addition, according to this exemplary embodiment, driving section 27 applies voltage to liquid crystal device 2a formed on the rear side of liquid crystal shutter eyeglass 20 of liquid crystal devices 2a and 2b so as to cause liquid crystal shutter 21 to change to the light transmitting state.

In this case, the direction of the maximum brightness region in which the transmissivity becomes the highest in liquid crystal shutter 21 that is in the light transmitting state matches the direction of light leakage in which light leaks from liquid crystal shutter 21 that lies in the light shading state. Thus, flickering concerning which the viewer becomes conscious can be alleviated.

EXAMPLE 1

As Example 1 of the present invention, with reference to FIG. 10 and FIG. 11A to FIG. 11D, brightness distributions of liquid crystal shutter eyeglass 20 will be described.

A alignment treatment was performed on both horizontal alignment film 7a and vertical alignment film 7b of each of liquid crystal devices 2a and 2b. Thickness d of liquid crystal material 6 of each of liquid crystal devices 2a and 2b was 2.4 μm, the refractive index anisotropy Δn thereof was 0.21, and the chiral pitch p thereof was 8 μm. Liquid crystal shutter 21 using 90° H-TN type liquid crystal devices that satisfy those conditions was manufactured.

Figure 10:
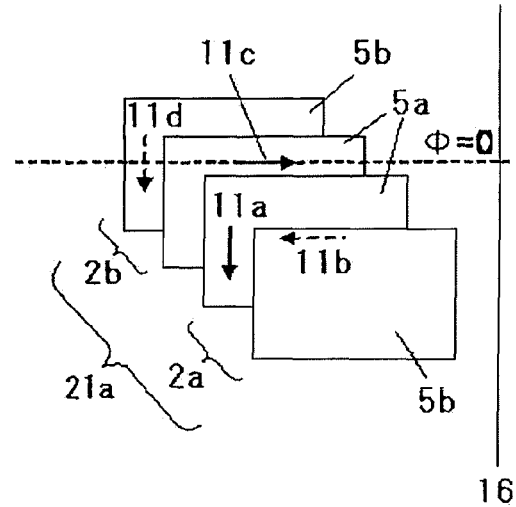
FIG. 10 is a schematic diagram showing the liquid crystal shutter eyeglass using the 90° H-TN type liquid crystal device.

As shown in FIG. 10, it is assumed that alignment treatment direction 11c of horizontal alignment film 7a of liquid crystal device 2b formed on the front side of liquid crystal shutter eyeglass 20 is parallel to the width direction of liquid crystal shutter eyeglass 20. In addition, it is assumed that pre-tilt angle 15 of substrate 5a orients the center of the face of the viewer.

Figure 11A:
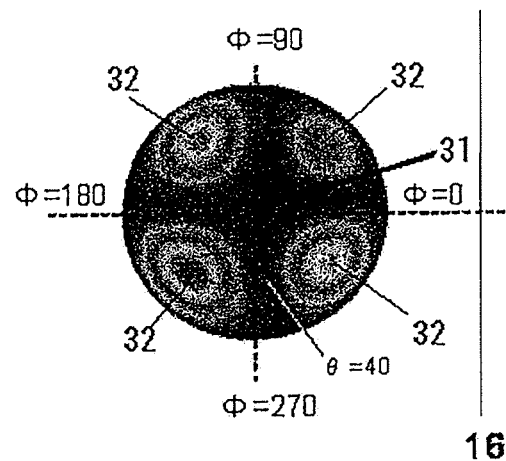
FIG. 11A is a descriptive diagram exemplifying a brightness distribution of the liquid crystal shutter eyeglass that is in the voltage applied state and light shading state.

FIG. 11A is a descriptive diagram showing the brightness distribution of liquid crystal shutter 21 in the case that a voltage (5 V) is applied to liquid crystal devices 2a and 2b of liquid crystal shutter 21 shown in FIG. 10. This brightness distribution corresponds to state 4C shown in FIG. 7. In this case, both liquid crystal devices 2a and 2b change to the ON state and thereby liquid crystal shutter 21 change to the light shading state. In the drawing, $\phi$ represents the azimuth, $\theta$ represents the polar angle, the line of $\phi=0°-180°$ represents the width direction of liquid crystal shutter eyeglass 20.

Light shading region 31 that is a region where the brightness of liquid crystal shutter 21 is low spreads in the vicinity of regions of lines of azimuths $\phi=0°-180°$ and $\phi=90°-270°$. In contrast, light leakage region 32, that is a region where the brightness of liquid crystal shutter 21 is high, spreads in the vicinity of regions of polar angles $\theta=40°$ to $60°$ at azimuths 45°, 135°, 225°, and 315° that are out of range of movement of the eyes of the viewer.

Thus, light leakage from the width direction of liquid crystal shutter eyeglass 20 where the line of sight of the viewer tends to move in the light shading state can be alleviated.

Figure 11B:
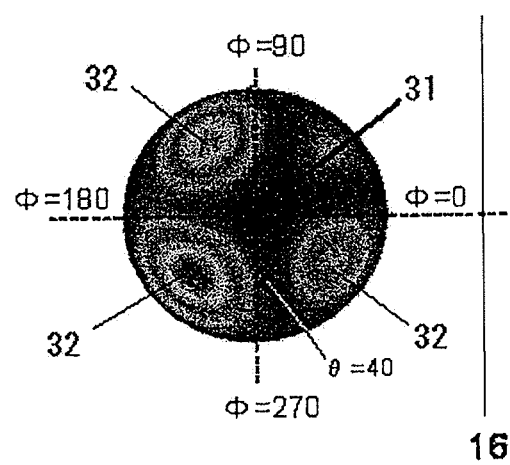
FIG. 11B is a descriptive diagram exemplifying a brightness distribution of the liquid crystal shutter eyeglass that is in the voltage OFF state.
Figure 11C:
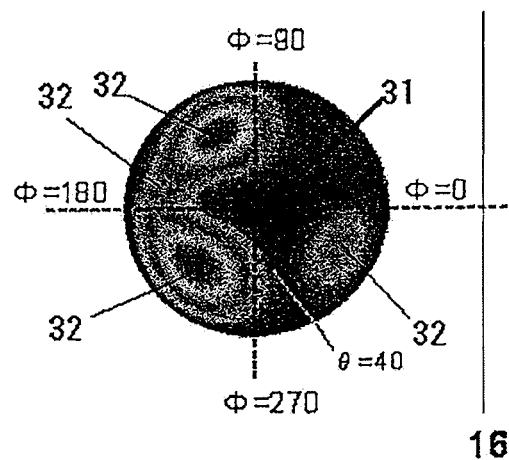
FIG. 11C is a descriptive diagram exemplifying another brightness distribution of the liquid crystal shutter eyeglass that is in the voltage off state.
Figure 11D:
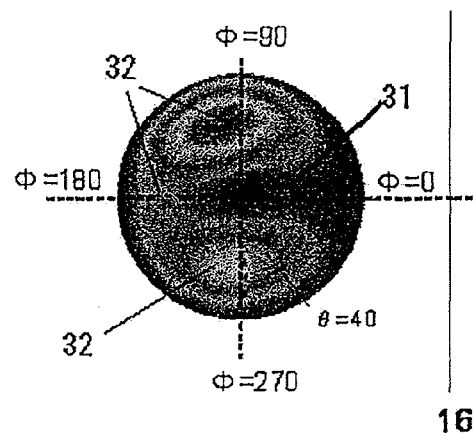
FIG. 11D is a descriptive diagram exemplifying another brightness distribution of the liquid crystal shutter eyeglass that is in the voltage OFF state.

FIG. 11B to FIG. 11D are descriptive diagrams showing brightness distributions of liquid crystal shutter 21 in the case in which liquid crystal devices 2a and 2b are in the OFF state (changed from the both ON state to the both OFF state). These brightness distributions correspond to the case that liquid crystal shutter 21 changes from state 4C to state 4D shown in FIG. 7. FIG. 11B shows a brightness distribution in which the voltage is 3 V, FIG. 11C shows a brightness distribution in which the voltage is 2 V, FIG. 11D shows a brightness distribution in which the voltage is 0 V (both OFF state).

In FIG. 11B, although light leakage region 32 spreads in the vicinity of regions of polar angles $\theta=40$ to $60°$ at azimuths $\theta=135°$, 225°, and 315°, light leakage in the vicinity of regions at azimuth $\phi=45°$ and polar angles $\theta=40$ to $60°$ decreases.

In FIG. 11C and FIG. 11D, although light leakage region 32 spreads in the vicinity of regions of polar angles $\theta=0°$ to 40° at azimuths $\phi=0°$ and $\phi=180°$, light shading region 31 spreads in the vicinity of regions of polar angles $\theta=0°$ to 40° at azimuths $\phi=0°$ and $\phi=180°$.

In any of the foregoing cases, since light leakage region 32 is not lie in the direction of the center of the face that the line of sight of the viewer tends to move, lateral light leakage is alleviated.

EXAMPLE 2

As Example 2, with reference to FIG. 12, the response time and light leakage of the liquid crystal shutter eyeglass that is in the OFF state described in Example 1 will be described.

The response time during which liquid crystal shutter 1 changes from the light shading state to the light transmitting state (period of time necessary during changing from transmissivity 10% to transmissivity 90%) was 0.4 mS. The response time for which liquid crystal shutter 1 changes from the light transmitting state to the light shading state (period of time necessary for changing from transmissivity 90% to transmissivity 10%) was 0.4 mS, which is the same as the response time during which liquid crystal shutter 1 changes from the light shading state to the light transmitting state.

Figure 12:
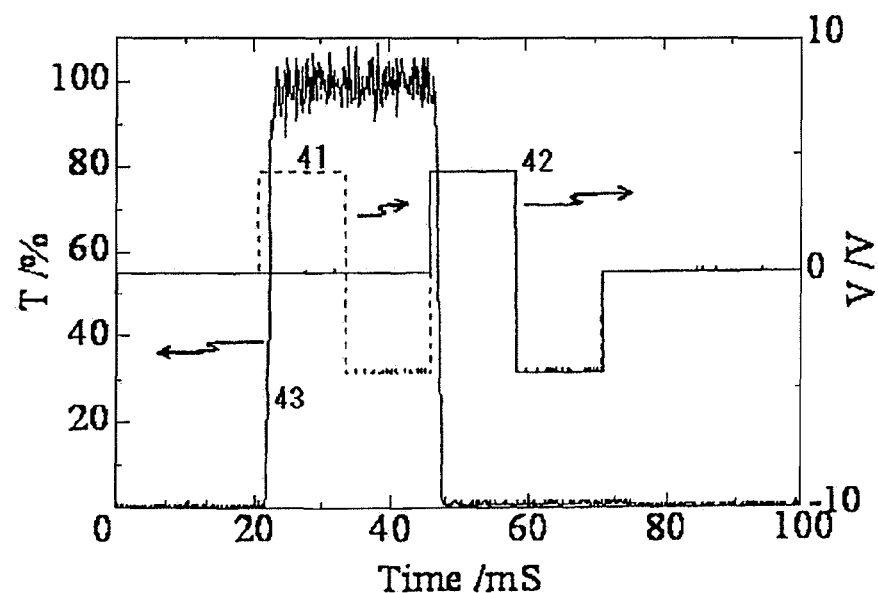
FIG. 12 is a descriptive diagram describing light leakage on the front side of the liquid crystal shutter.

FIG. 12 is a descriptive diagram showing light leakage on the front side of liquid crystal shutter 1. In FIG. 12, the horizontal axis represents time (Time) [mS], whereas the vertical axis represents the transmissivity (T) [%] and voltage (V) [V]. In FIG. 12, voltage 41 represents voltage applied to a first liquid crystal device, whereas voltage 42 represents voltage applied to a second liquid crystal device. Electro-optical response 43 represents an electro-optical response (transmissivity) of liquid crystal shutter 1.

As shown in FIG. 12, even in the both ON state and the both OFF state where liquid crystal shutter 1 is in the light shading state and in the OFF state where liquid crystal shutter 1 changes from the both ON state to the both OFF state, the transmissivity is around 0%. In these cases, there is a remarkable difference between these transmissivities. Thus, it is clear that an electro-optical response in which light leakage on the front side of liquid crystal shutter 1 is low is obtained from liquid crystal shutter 1 that is in the light shading state and the OFF state.

EXAMPLE 3

As Example 3, with reference to FIG. 13 and FIG. 14, the brightness distribution of liquid crystal shutter eyeglass 20 described in Example 1 in the case in which it is in the light transmitting state will be described. This brightness distribution corresponds to state 4B shown in FIG. 7.

Figure 13:
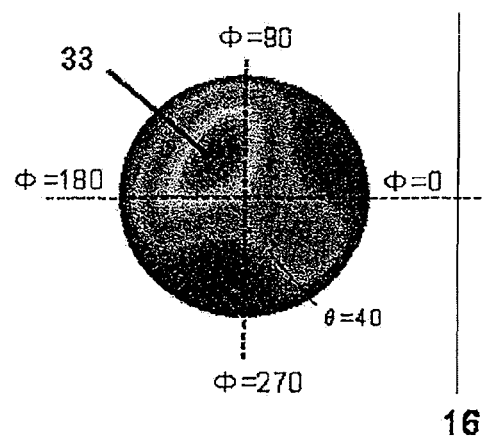
FIG. 13 is a descriptive diagram showing a brightness distribution of a viewer-side liquid crystal device that is in the voltage ON state.

FIG. 13 is a descriptive diagram showing the brightness distribution of liquid crystal shutter 1 in the case in which voltage (5 V) is applied to liquid crystal device 2a formed on the front side of liquid crystal shutter 1 shown in FIG. 10.

In this case, liquid crystal device 2a changes to the ON state and thereby liquid crystal shutter 1 changes to the light transmitting state. Maximum brightness region 33 is in the vicinity of a region at azimuth $\phi=135°$ and polar angle $\theta=25°$ and matches the direction of light leakage region 32 in which liquid crystal shutter 1 is in the light shading state shown in Example 1. Thus, when liquid crystal shutter 1 is changed from the light transmitting state and the light shading state, flickering of concerning which the viewer becomes conscious can be alleviated.

Figure 14:
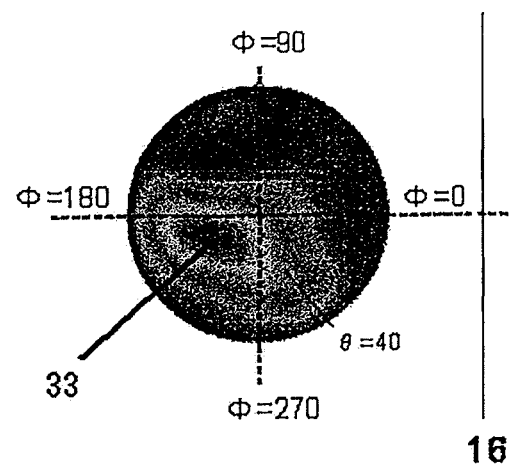
FIG. 14 is a descriptive diagram showing a brightness distribution of a non-viewer-side liquid crystal device that is in the voltage ON state.

FIG. 14 is a descriptive diagram showing the brightness distribution of liquid crystal shutter 1 in the case in which a voltage (5 V) is applied to liquid crystal device 2b formed on the rear side of liquid crystal shutter 1 shown in FIG. 10.

In this case, maximum brightness region 33 was in the vicinity of a region at azimuth $\phi=210°$ and polar angle $\theta=30°$ and did not match the direction of light leakage region 32 in which liquid crystal shutter 1 was in the light shading state shown in Example 1.

Thus, it is preferable that voltage be applied to liquid crystal device 2a on the viewer side and thereby the liquid crystal shutter be caused to change to the light transmitting state so as to alleviate flickering concerning which the viewer becomes conscious.

Now, with reference to the exemplary embodiments, the present invention has been described. However, it should be understood by those skilled in the art that the structure and details of the present invention may be changed in various manners without departing from the scope of the present invention.

The present invention can be applied to a liquid crystal shutter eyeglass used for a field sequential display system.

The present application claims priority based on Japanese Patent Application JP 2009-146495 filed on Jun. 19, 2009, the entire contents of which are incorporated herein by reference in its entirety.

What is claimed is:

1. A liquid crystal shutter having a stack structure in which a pair of liquid crystal devices are stacked, the pair of liquid crystal devices having a pair of substrates on which alignment films are coated and a liquid crystal material injected into the pair of substrates; a polarizer formed on one of two principal planes of said stack structure; and an analyzer formed on the other principal plane of said stack structure,
   wherein a light transmission axis of said polarizer is intersected with a light transmission axis of said analyzer,
   wherein an alignment film coated on a substrate adjacent to another liquid crystal device of said pair of substrate of each of the liquid crystal devices is a horizontal alignment film and an alignment film coated on the other substrate is a vertical alignment film,
   wherein alignment treatment is performed on the horizontal alignment film of the liquid crystal device having said polarizer of said stack structure in a direction parallel to the light transmission axis of said analyzer and alignment treatment is performed on the horizontal alignment film of the liquid crystal device having the analyzer of said stack structure in a direction parallel to the light transmission axis of said polarizer, and
   wherein liquid crystal materials of the liquid crystal devices have a positive dielectric anisotropy and have twisting directions that are the reverse of each other.

2. The liquid crystal shutter as set forth in claim 1,
   wherein the light transmission axis of said polarizer is orthogonal to that of said analyzer, and
   wherein the alignment treatment has been performed on the horizontal alignment films coated on substrates that are adjacent in directions that are orthogonal to each other.

3. The liquid crystal shutter as set forth in claim 1,
   wherein a product of a thickness of the liquid crystal material injected into one of the liquid crystal devices and a refractive index anisotropy of the liquid crystal material is equal to or nearly equal to a product of a thickness of the liquid crystal material injected into the other liquid crystal device and the refractive index anisotropy of the liquid crystal material.

4. The liquid crystal shutter as set forth in claim 1,
   wherein a chiral pitch of the liquid crystal material injected into one of the liquid crystal devices is equal to or nearly equal to that of the liquid crystal material injected into the other liquid crystal device.

5. A liquid crystal shutter eyeglass having a liquid crystal shutter as set forth in claim 1.

6. The liquid crystal shutter eyeglass as set forth in claim 5, wherein the alignment treatment is performed on the horizontal alignment film of the liquid crystal device formed on the front side of said liquid crystal shutter eyeglass of said pair of liquid crystal devices in a width direction of said liquid crystal shutter eyeglass.

7. The liquid crystal shutter eyeglass as set forth in claim 6, wherein liquid crystal molecules on the substrate having the horizontal alignment film on which the alignment treatment has been performed in said width direction are tilted in a direction where longer axes of the liquid crystal molecules are located apart from the substrate in reverse proportion to a distance from the inside of said liquid crystal shutter eyeglass.

8. The liquid crystal shutter eyeglass as set forth in claim 5, wherein when voltage is not applied to said pair of liquid crystal devices, said liquid crystal shutter changes to a light shading state in which light is caused to be shaded, and wherein said liquid crystal shutter eyeglass also has driving means that applies voltage to the liquid crystal device formed on the rear side of said liquid crystal shutter eyeglass of said pair of liquid crystal devices so as to cause said liquid crystal shutter to change to a light transmitting state in which light is caused to be transmitted.

\* \* \* \* \*